(12) United States Patent
Sliger et al.

(10) Patent No.: US 9,344,528 B2
(45) Date of Patent: May 17, 2016

(54) DATA COMPRESSOR USING HINTS

(75) Inventors: Michael Sliger, Sammamish, WA (US);
Voicu Anton Albu, Redmond, WA (US);
Vladimir K. Stoyanov, Redmond, WA (US); Nadim Y. Abdo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 361 days.

(21) Appl. No.: 13/222,927

(22) Filed: Aug. 31, 2011

(65) Prior Publication Data

US 2013/0054835 A1 Feb. 28, 2013

(51) Int. Cl.
*G06F 15/16* (2006.01)
*H04L 29/06* (2006.01)

(52) U.S. Cl.
CPC ............. *H04L 67/38* (2013.01); *H04L 69/04* (2013.01)

(58) Field of Classification Search
CPC ............................. H04L 67/38; H04L 69/04
USPC ........................................................ 709/247
See application file for complete search history.

(56) References Cited

U.S. PATENT DOCUMENTS

| | | | |
|---|---|---|---|
| 6,426,711 B1 | 7/2002 | Cooper | |
| 6,624,761 B2 * | 9/2003 | Fallon | 341/51 |
| 7,548,657 B2 * | 6/2009 | Deaven | 382/243 |
| 7,765,346 B2 | 7/2010 | Peuter et al. | |
| 8,392,596 B2 * | 3/2013 | Kamay | 709/231 |
| 2003/0236909 A1 * | 12/2003 | Chu | 709/232 |
| 2009/0077252 A1 | 3/2009 | Abdo et al. | |
| 2010/0138744 A1 * | 6/2010 | Kamay et al. | 715/716 |
| 2010/0254622 A1 * | 10/2010 | Kamay et al. | 382/239 |
| 2011/0090950 A1 | 4/2011 | Bush et al. | |
| 2011/0145486 A1 * | 6/2011 | Owa et al. | 711/103 |
| 2013/0011064 A1 * | 1/2013 | Kamay et al. | 382/173 |
| 2013/0039408 A1 * | 2/2013 | Cohen et al. | 375/240.01 |

OTHER PUBLICATIONS

"Cisco WAAS Optimizations for Centralized E-Mail Services," http://www.cisco.com/en/US/prod/collateral/contnetw/ps5680/ps6870/prod_white_paper0900aecd8051c11d.html, accessed Jul. 18, 2011, 4 pages.
"Fast Data Compression," http://fastcompression.blogspot.com/2011/02/improved-sampling-for-better.html, accessed Jul. 18, 2011, 3 pages.
"XMill: an Efficient Compressor for XML Data," http://citseerx.ist.psu.edu/viewdoc/download?doi=10.1.1.40.604&rep=rep1&type=ps, published 2000, 26 pages.

* cited by examiner

*Primary Examiner* — Bryan Lee
(74) *Attorney, Agent, or Firm* — Kate Drakos; Danielle Johnston Holmes; Micky Minhas (57) ABSTRACT

An invention is disclosed for compressing data. In embodiments of the invention, input data is processed to determine one or more hints, or meta-data about how to compress the data. These hints may be produced based on the contents of the data itself, or by the process which generated the data. A hint may comprise an indication that a portion of the data matches another portion of the data, an indication that the portion of the data should not be compressed by an associated compressor, or an indication that the portion of the data should be compressed normally by the associated compressor. The source data and these hints may then be sent to a compressor, which traverses both the source data and the hints, and encodes the source data accordingly to produce an encoded data output stream.

19 Claims, 8 Drawing Sheets

| 700 Source | 702 Intermediate | 704 Compressed |
|---|---|---|

```
700                                         702                                      704
Source                                   Intermediate                             Compressed 000:  Yankee Doodle went to town      {@333,101,L109}                       {@333,101,L109}
028:  A-riding on a pony              {@556,101,L109}                       {@556,101,L109}
048:  Stuck a feather in his cap      {@664,0,L210}                         {@664,0,L210}
076:  And called it macaroni.         {@873,101,L109}                       {@873,101,L109}
101:  Yankee Doodle, keep it up       Yankee Doodle went to town            Yankee Doodle went to{18,3}wn
128:  Yankee Doodle dandy             A-riding on a pony                    A-riding on a pony
149:  Mind the music and the step     Stuck a feather in his cap            Stuck{40,3}feather in his cap
178:  And with the girls be handy.    And called it macaroni.               And{72,3}lled it macaroni.
210:  Father and I went down to camp  Yankee Doodle, keep it up             {0,13}, keep {87,3}up
242:  Along with Captain Gooding      Yankee Doodle dandy                   {0,14}dandy
270:  And there we saw the men and boys Mind the music and the step         Mi{77,3}the music {144,3}{153,5}step
305:  As thick as hasty pudding.      And with the girls be handy.          A{151,3}with{169,5}girls be h{143,4}.
333:  Yankee Doodle, keep it up       Father and I went down to camp        Fa{187,3}r{164,4} I went down to camp
360:  Yankee Doodle dandy             Along with Captain Gooding            Along{181,6}Captain Gooding
381:  Mind the music and the step    And there we saw the men and boys     {178,3}{186,4}re w{172,3}aw{273,4} men a{271,3}boys
410:  And with the girls be handy     As thick as hasty pudding.            As{287,3}ick as hasty pudd{266,3}.
441:  There was Captain Washington    There was Captain Washington          T{275,5}was{252,9}Washington
471:  Upon a slapping stallion        Upon a slapping stallion              Upon a slap{465,3} stallion
497:  A-giving orders to his men      A-giving orders to his men            A-giv{483,4}orders{234,4}his{292,4}
525:  I guess there were a million.   I guess there were a million.         I guess{273,7}we{444,3}a mi{492,5}.
556:  Yankee Doodle, keep it up
583:  Yankee Doodle dandy
604:  Mind the music and the step
633:  And with the girls be handy
664:  Yankee Doodle went to town
692:  A-riding on a pony
712:  Stuck a feather in his cap
740:  And called it macaroni.
765:  Yankee Doodle, keep it up
792:  Yankee Doodle dandy
813:  Mind the music and the step
842:  And with the girls be handy
873:  Yankee Doodle, keep it up
900:  Yankee Doodle dandy
921:  Mind the music and the step
950:  And with the girls be handy
```

FIG. 7

|     | 700<br>Source | 802<br>metadata table | 804<br>Compressed |
|-----|---------------|------------------------|-------------------|
| 000: | Yankee Doodle went to town | {@333,101,L109} | Yankee Doodle went to{18,3}wn |
| 028: | A-riding on a pony | {@556,101,L109} | A-riding on a pony |
| 048: | Stuck a feather in his cap | {@664,0,L210} | Stuck{40,3}feather in his cap |
| 076: | And called it macaroni. | {@873,101,L109} | And{72,3}lled it macaroni. |
| 101: | Yankee Doodle, keep it up | | {0,13}, keep {87,3}up |
| 128: | Yankee Doodle dandy | | {0,14}dandy |
| 149: | Mind the music and the step | | Mi{77,3}the music {144,3}{153,5}step |
| 178: | And with the girls be handy. | | A{151,3}with {169,5}girls be h{143,4}. |
| 210: | Father and I went down to camp | | Fa{187,3}r{164,4} I went down to camp |
| 242: | Along with Captain Gooding | | Along{181,6}Captain Gooding |
| 270: | And there we saw the men and boys | | {178,3}{186,4}re w{172,3}aw{273,4} men a{271,3}boys |
| 305: | As thick as hasty pudding. | | As{287,3}ick as hasty pudd{266,3}. |
| 333: | Yankee Doodle, keep it up | | {101,109} |
| 360: | Yankee Doodle dandy | | T{275,5}was{252,9}Washington |
| 381: | Mind the music and the step | | Upon a slap{465,3} stallion |
| 410: | And with the girls be handy | | A-giv{483,4}orders{234,4}his{292,4} |
| 441: | There was Captain Washington | | I guess{273,7}we{444,3}a mi{492,5}. |
| 471: | Upon a slapping stallion | | {101,109} |
| 497: | A-giving orders to his men | | {0,210} |
| 525: | I guess there were a million. | | {101,109} |
| 556: | Yankee Doodle, keep it up | | |
| 583: | Yankee Doodle dandy | | |
| 604: | Mind the music and the step | | |
| 633: | And with the girls be handy | | |
| 664: | Yankee Doodle went to town | | |
| 692: | A-riding on a pony | | |
| 712: | Stuck a feather in his cap | | |
| 740: | And called it macaroni. | | |
| 765: | Yankee Doodle, keep it up | | |
| 792: | Yankee Doodle dandy | | |
| 813: | Mind the music and the step | | |
| 842: | And with the girls be handy | | |
| 873: | Yankee Doodle, keep it up | | |
| 900: | Yankee Doodle dandy | | |
| 921: | Mind the music and the step | | |
| 950: | And with the girls be handy | | |

FIG. 8

DATA COMPRESSOR USING HINTS

BACKGROUND

In a remote presentation session, a client computer and a server computer communicate across a communications network. The client sends the server locally-received input, such as mouse cursor movements and keyboard presses. In turn, the server receives this input and performs processing associated with it, such as executing an application in a user session. When the server performs processing that produces output, such as graphical output or sound, the server sends this output to the client for presentation. In this manner, applications appear to a user of the client to execute locally on the client when they, in fact, execute on the server.

In a remote presentation session, the amount of graphical data generated by a server commonly exceeds the amount of communications network bandwidth between the server and the client. In view of this restriction of bandwidth, it is common for the server to compress the graphical data before transmitting it to the client. Sometimes the server will generate a byte stream to send to the client and then compress the byte stream before sending it to the client. This compression of the byte stream is frequently referred to as "bulk compression." There are many problems with current implementations of bulk compressors, some of which are well known.

SUMMARY

One problem with current implementations of bulk compressors is that they are limited in the amount of compression that they can perform. A frequent restriction for bulk compression in a remote presentation session is a restriction on the amount of available time with which to perform the compression. In a remote presentation session, it is generally desirable to reduce the amount of time between when a user at the client provides input and when that user is displayed graphical output corresponding to that input being performed. Given this restriction on time, it is generally advantageous for a remote presentation session bulk compressor to compress data well while still performing that compression in a limited amount of time.

The present invention offers improved data compression. In embodiments of the present invention, the amount of compression performed under the constraints of available processing resources and/or time is improved. In embodiments, data to be compressed is evaluated and portions thereof are classified with "hints," or techniques for compressing that portion of data—meta-data generated from the data, or by the process which assembled the data, that describes a characteristic about the compressibility of the source data. For example, a given input data may be classified in three separate portions, such that one portion is to be compressed normally, one portion is to be literally copied or transferred to an output stream rather than being compressed (or compressed further), and one portion is recognized as a match of another portion, and is to be encoded in the output stream as a reference to the first match.

Hints may be determined in a variety of ways. In embodiments of the invention, hints for matches are determined using rolling hashes. A rolling hash may be performed on source data, and those hash values that match a characteristic of a subset of the possible hash values (e.g. those hash values that are below a threshold) are identified, along with their corresponding data. These qualifying hash values are then compared to determine which of them are equal to each other. Where two qualifying hash values are equal, their corresponding data (and the data that neighbors that corresponding data) are compared to determine how large of a contiguous region matches. These matched areas are then compressed by encoding the redundant second matching area as a reference to the first matching area. By encoding large matches this way, time is saved by not finding and encoding these matches via a more-exhaustive search.

In addition to matches, hints may be generated for portions of the data that are not to be compressed. For instance, a hint may be generated to not compress a portion of the data where the data has already been compressed, such as image data encoded with an image codec, like JPEG (Joint Photographic Experts Group) format. It may be that attempting to further compress this portion of the data consumes too many computing resources relative to the additional compression gained, or that this "not to be compressed" data may be sent to a compressor along with the hint that it should be encoded as literals into an output compressed data. The compressor may still perform non-compression-related encoding, such as where the output compressed data has a different format than the input data.

The remainder of the data may be compressed by the compressor normally—either as a result of an indication that the data should be compressed normally, or as a default operation of the encoder. This compressed data assembled in three different ways—as a match, as data not to be compressed, and as normally compressed data—may be collected as a compressed output data that may be sent to a client in a remote presentation session.

BRIEF DESCRIPTION OF THE DRAWINGS

FIG. 7 depicts an example compression of data.

FIG. 8 depicts another example compression of data.

DETAILED DESCRIPTION OF ILLUSTRATIVE EMBODIMENTS

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is left to an implementer.

Figure 1:
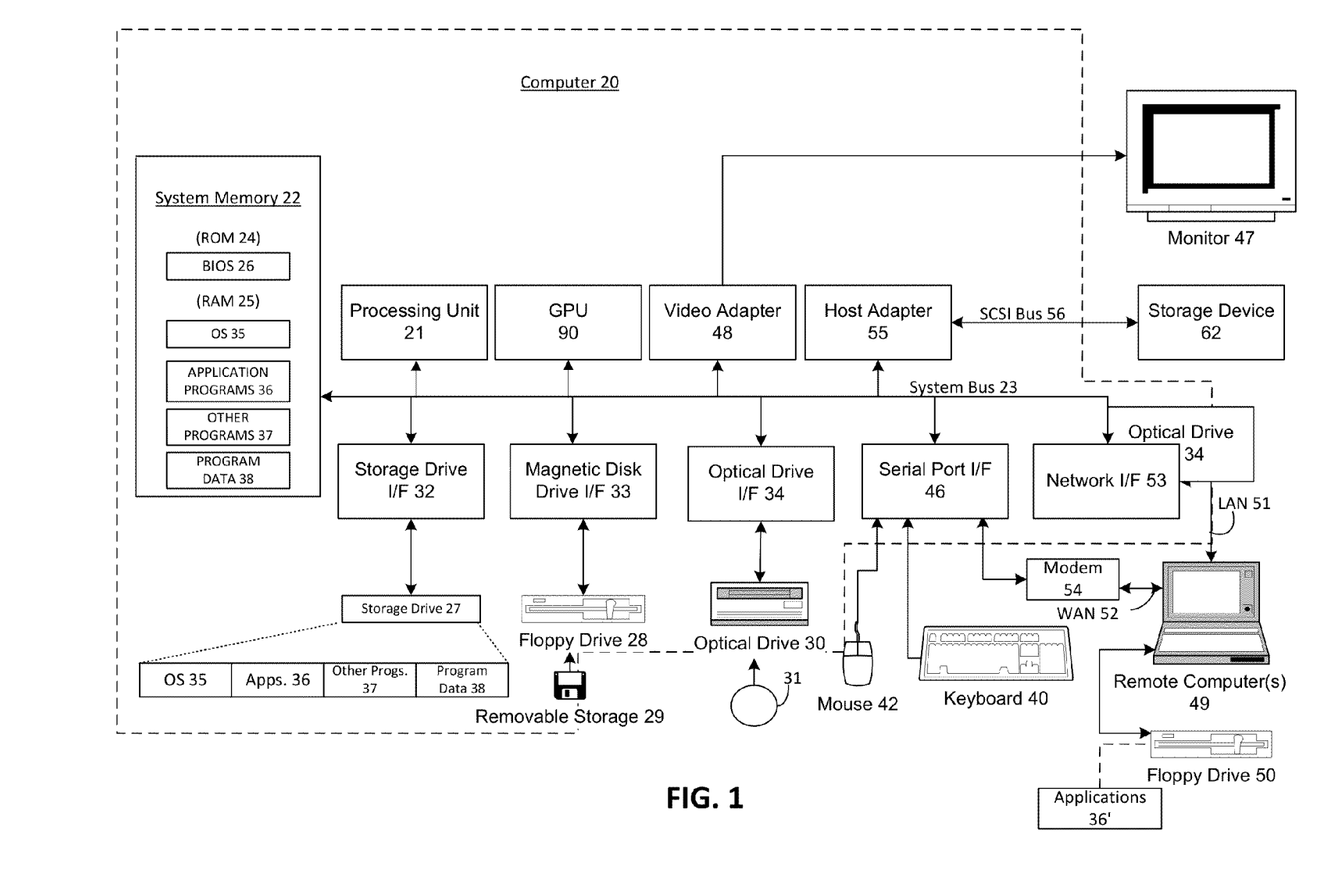
FIG. 1 depicts an example general purpose computing environment in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example computing system. The computing system may include a computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
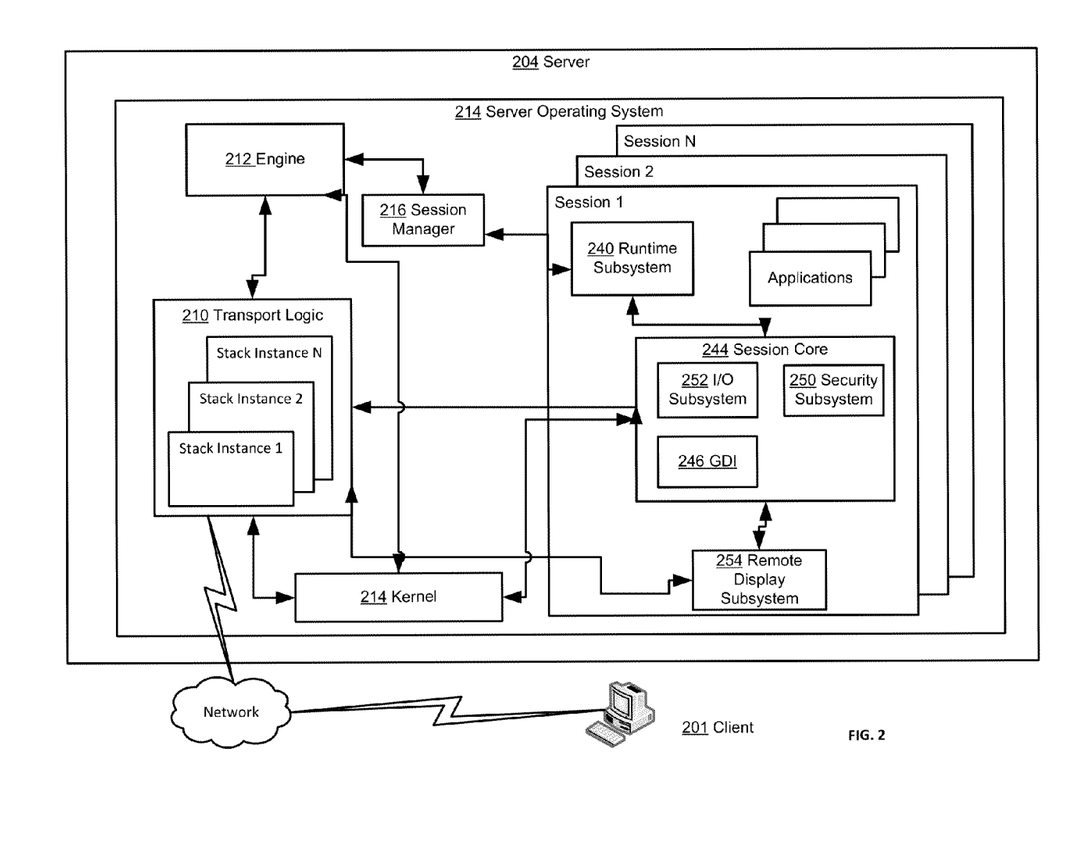
FIG. 2 depicts an example remote presentation session server in which embodiments of the invention may be implemented.

FIG. 2 generally illustrates an example environment wherein aspects of the present invention can be implemented. For instance, server 204 may implement the data compressors of FIG. 3 or 4. One skilled in the art can appreciate that the example elements depicted by FIG. 2 are illustrated to provide an operational framework for describing the present invention. Accordingly, in some embodiments the physical layout of each environment may be different depending on different implementation schemes. Thus the example operational framework is to be treated as illustrative only and in no way limit the scope of the claims.

Depicted in FIG. 2 is server 204, which may include circuitry configured to effectuate a remote presentation session server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present invention can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present invention can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote display subsystem 254 can be configured to include virtual display driver(s) that may not be associated with displays physically attacked to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present invention, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3:
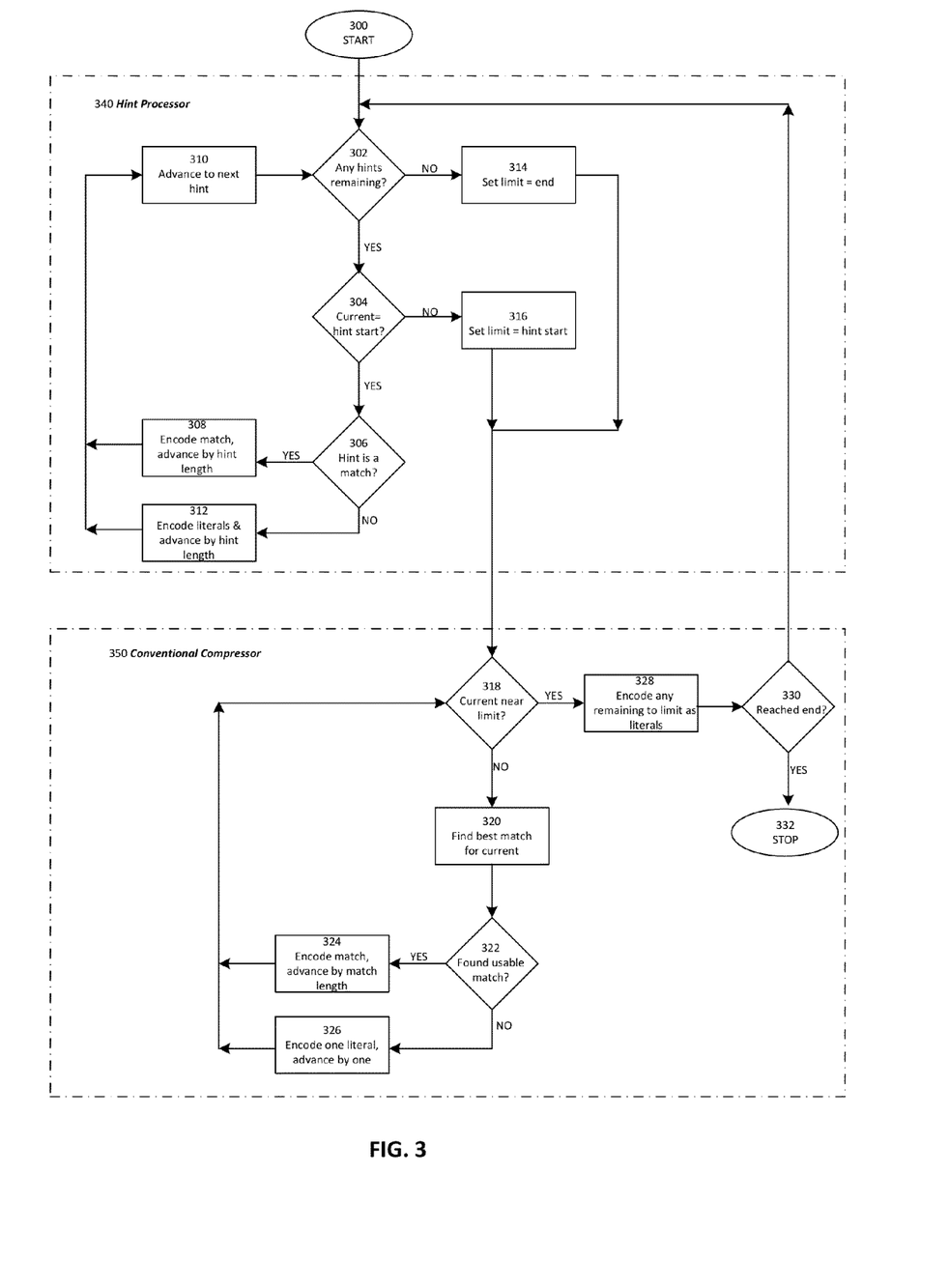
FIG. 3 depicts an example data compressor that implements embodiments of the invention.

FIG. 3 depicts an example data compressor that implements embodiments of the invention. In embodiments of the invention, the data compressor of FIG. 3 may be implemented in server 204 of FIG. 2 so that it may bulk compress data that is to be transmitted to client 201 of FIG. 2 in a remote presentation session. As depicted in FIG. 3, the example data compressor may be logically separated into two portions—hint processor 340 and compressor 350. Hint processor 340 generally traverses an enumeration of hints (also referred to herein as techniques for encoding or compressing data) about the data to be compressed, and compresses the data where a corresponding hint indicates that the data may be compressed. Compressor 350 generally compresses data for which a hint does not indicate that hint provider 340 may compress the data.

The data compressor of FIG. 3 has a process flow that begins at 300. After 300, the process flow moves to decision 302, which determines whether any hints remain that have not been processed by hint processor 340 relative to the present data. A hint may comprise an indication that (1) the a portion of the data matches another portion and is to be encoded as a reference to that other portion; (2) that a portion of the data is not to be further compressed by compressor 350 (note: compressor 350 may be considered an encoder, such as where data is sent to compressor 350 along with a hint that it is not to be compressed, and compressor 350 does not compress this portion of the data that it processes); or (3) that a portion of the data is to be compressed normally. Where there is a hint that has not been processed by hint processor 340 relative to the present data, the process flow moves to decision 304, which determines whether the current part of data of the data to be encoded corresponds to the start point for a hint. For example, if the data to be compressed is 1,000 bytes long, and there is one hint that starts with a portion of the data beginning at byte 500, where the data compressor is at byte 500, then the answer to decision 304 is yes, and if the data compressor is at any one of bytes 1-499 or 501-1,000, the answer to decision 304 is no.

Where the answer to decision 304 is, yes, the current character is the start of the hint, then the process flow moves to decision 306. Decision 306 determines whether the hint indicates that the current character begins a segment of the data that matches another segment of the data. Where the answer to decision 306 is yes, the process flow moves to operation 308.

At operation 308, the match is encoded, and the position within the data to be compressed is advanced by the length of the match. For instance, where the current character is #500 and the hint indicates a match of 100 characters, the match of characters #500-599 is encoded (such as with a reference to the prior match), and the process advances to character #600 of the data for further processing. After operation 308, the process flow moves to operation 310. In operation 310, the enumeration of hints is advanced to the next hint (such as advancing one position in a list where the hints are stored in a list). The process flow moves back to decision 302, which determines whether there are additional hints to process.

If at decision 306 it is determined that the hint is not indicative of there being a match, but that a region should not be compressed by compressor 350, the process flow moves to operation 312. At operation 312, the portion of the data to be compressed indicated by the current hint is encoded as literals (i.e., not compressed), and the current position in the data to be compressed is advanced by the length of these characters that are encoded as literals. In embodiments, rather than this data that is not to be compressed being encoded by process 312, the data is sent to compressor 350 along with a hint indicating that the data is not to be compressed, and compressor 350 encodes the data as literals. After operation 312, the process flow then moves again to operation 310, which advances to the next hint in the enumeration of hints.

Returning to decision 302, previously, the process flow was described where it is determined that there are hints remaining. Where there are no hints remaining, the process flow moves to operation 314, where an indication of the last character of a region to be compressed by compressor 350 is marked as the last character of the data to be compressed. Then, the process flow moves to decision 318, which is the entry point to compressor 350.

Returning to decision 304, a similar process occurs here as with decision 302. Previously, the process flow was described where the current character of the data to be compressed is the start of a hint. Where, instead, the current character of the data to be compressed is not the start of a hint, the process flow moves to operation 316. At operation 316, the indication of the last character of a region to be compressed by compressor 350 is set to be one character before the start of the character at which the hint begins. For example, if the current character is #500, and the current hint starts at character #600, then at operation 316, the last character of a region to be compressed by compressor 350 is set to character #599, so that compressor 350 will compress the region from characters #500-#599, inclusive. After operation 316 has been carried out, the process flow moves to decision 318, which is the entry point to compressor 350.

Compressor 350 begins with decision 318. Decision 318 determines whether the current character of the portion of data to be compressed is near the limit character. In embodiments of the invention, it may be determined that matches of a certain size (e.g. two or fewer characters) will not be compressed. These small matches may not be compressed, for instance, because it is determined that there is not a compression benefit available in small matches, or because it is determined that the time or processing resources cost associated with compressing small matches outweighs the compression benefits from compressing small matches.

Where at decision 318 it is determined that the current character is not near the limit, the process flow moves to operation 320. At operation 320, the compressor finds the best match for the current character. In embodiments, this best match may be the longest match (with a previous part of the data to be compressed) that starts with the present character. In embodiments, this best match may be the longest match that starts with the present character that may be found within some restriction of time or processing resources. In embodiments, this best match may be the best match that occurs within a sliding window—i.e. a specified number of characters preceding the present character. In embodiments, the length of the best match does not run so long that it exceeds the number of characters sent from hint processor 340 to compressor 350 for compression. For example, where hint processor 340 sends 100 characters to compressor, from characters #500-#599, compressor 350 may not find a match in excess of 100 characters, or a match that goes past character #599. The process flow then moves from operation 320 to decision 322 after the best match is found in operation 320.

In decision 322, it is determined whether the best match of operation 320 (if one was found) is usable. In embodiments, it may be determined that only a match of at least a certain length is usable. This may be, for instance, because matches that are below a certain length are too short to compress. The process flow moves to operation 324 where a usable match is determined in operation 322. At operation 324, the usable match is encoded, and the current character is advanced by the length of the match. For instance, if the current character is #500, and a match of 50 characters is found, the current character will be advanced by 50 characters, to be set at character #550. The process flow will then return to decision 318.

If, at decision 322, it is instead determined that a usable match has not been found, the process flow moves to operation 326. In operation 326, the current character is encoded, and the current character is advanced one position (e.g., from character #500 to character #501). The process flow then returns to decision 318.

Returning to decision 318, previously, the process flow where the result of decision 318 is no was described. If, instead, the result of decision 318 is yes (indicating that the current character is near the limit of characters to be compressed indicated by hint processor 340), the process flow moves to operation 328. In operation 328, any remaining characters up to the limit are encoded as literals, and the process flow moves to decision 330. In decision 330, it is determined whether the end of the data to be compressed has been reached. If the end has been reached, the process flow moves to operation 332, where the process flow concludes. If, instead, the end has not been reached, the process flow returns to operation 302 of hint processor 340, where it is determined if the current character is the start of another hint.

Figure 4:
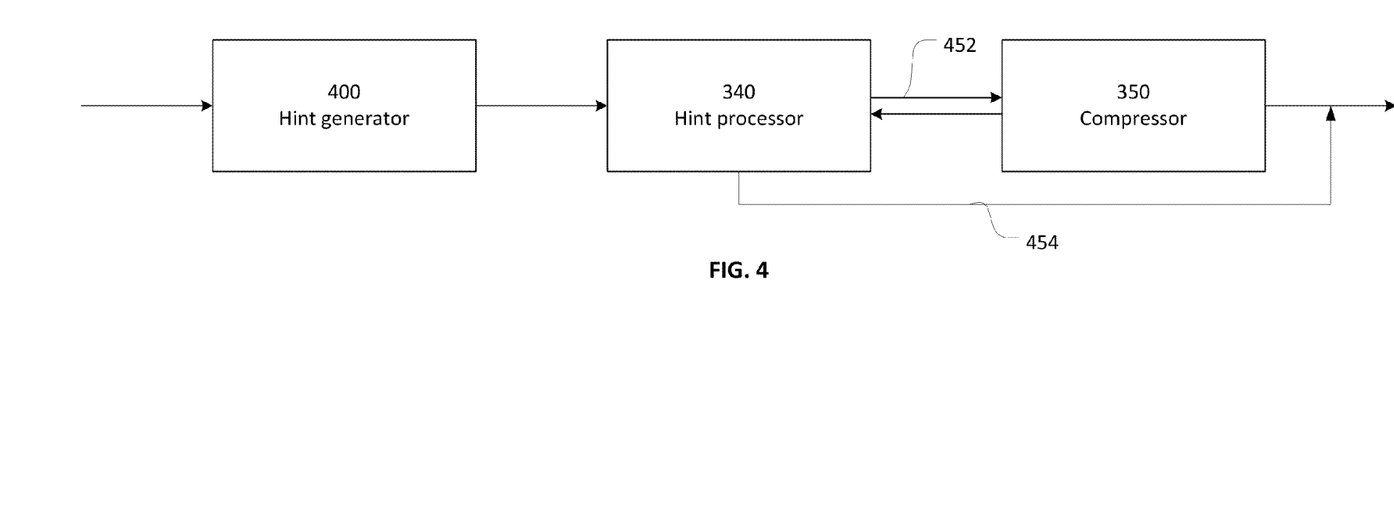
FIG. 4 depicts an example architecture that combines a hint generator with the data compressor of FIG. 3.

FIG. 4 depicts an example architecture that combines a hint generator with the data compressor of FIG. 3. Hint generator 400 may receive data to be transmitted to a client via a remote presentation session. Hint generator 400 may then analyze the data to be compressed to determine one or more hints about the data, and then send these hints to hint processor, which works with compressor 350 to compress the data based on the hints generated by hint generator 400. Hint generator 400 may determine a plurality of hints for the data—a hint may cover only a portion of the data. For instance, hint generator 400 may determine, based on the contents of a first portion of the data, to compress the first portion of the data with a first technique, and also determine, based on the contents of a second portion of the data, to encode the second portion of the data with a second technique. These first and second portions may then be encoded with the first technique and the second technique, respectively.

In embodiments, hint generator takes the data to be compressed, and calculates a rolling hash for a portion of the data starting with each bit or byte in the data. This rolling hash (a hash function where a window is used to traverse the data to be hashed; with each new element, that new element is added, and the oldest element from the window is dropped) may comprise, for example, a CRC hash (a cyclic redundancy check). The rolling hash may be used to produce a 32-bit number for each hashed portion of the data.

This rolling hash may be used to divide the data into portions. It may be too computationally complex (based on available computing resources) to compare each portion of data to each other portion of data to determine whether a match exists. In embodiments of the invention, this rolling hash is taken, and each such rolling hash value that is below a threshold value is identified. For example, where the hash produces a 32-bit result (approximately a 4-billion-value address space), the threshold may be set to $2^{18}$ (approximately 256,000), so that, on average, one in every $2^{14}$ bits (approximately 16,000) will be below the threshold value. Since rolling hashes typically produce a result that greatly differs from the input value, these hash values below the threshold value may be thought to be roughly evenly distributed, and the data may be divided into approximately 16 k-sized chunks.

Where hint generator 400 finds values below the threshold value, it may then compare matching values to determine whether they match. Where two values to match, hint generator may then search the surrounding areas of the matches to determine the size of the match for larger matching regions. Hint generator 400 may search both matches before the match for a continuous area of matches, and/or both matches after the match for a continuous area of matches. Where this matched area has been identified, hint generator 400 may mark the start and end of the match, and store a hint that tells hint processor 340 that this matched area is a match, and may be encoded, for instance, by writing a reference to the prior match.

Hint generator 400 may also determine that a portion of the data should not be compressed by compressor 350 and store a hint that indicates this. Hint generator 400 may determine that a portion of the data should not be compressed by compressor 350 such as where the data has already been compressed, or it is determined that an amount of computing resources required to compress the portion of the data outweighs an associated compression benefit. The portion of the data may have already been compressed such as where the portion of the data is image data in a compressed format, such as JPEG.

Hint generator 400 may also determine that a portion of the data is to be compressed normally, and store a hint that indicates this. In embodiments of the invention, a hint is produced for data indicating that the data should be compressed normally where it is neither data for which hint generator 400 found a match, nor is it data for which hint generator 400 determined that should not be compressed by compressor 350. Thus no explicit hint is needed for data which is to be compressed normally.

In embodiments of the invention two portions of the data may be encountered that are the same, or similarly situated (e.g. they are both image data, or hint generator 400 would determine the same hint for each given the same amount of available computing resources), and hint generator 400 may determine different hints for each. For example, hint generator 400 may determine that a first portion of the data is to be encoded normally. Hint generator 400 may then encounter a second portion of the data that is the same or similarly situated to the first portion of the data. However, where the available computing resources have decreased, hint generator 400 may determine that there are not enough available computing resources to encode the second portion normally, and may produce a hint for the second portion of the data that it is to be encoded into the output stream as literals and not compressed.

Hint processor may send hints and data to compressor 350 via communication link 452, where the data is compressed according to the hint, or hint processor may encode the data into the output stream itself via communication link 454. For example, in embodiments, where a portion of the data is to be compressed normally, the data to be compressed normally may be sent to compressor 350, and other data (such as data that is not to be compressed) may be encoded by hint processor 340 as literals in the output stream of encoded data. In other embodiments, hint processor 340 may send all data to compressor 350, even data that compressor 350 is to encode as literals into the encoded data output stream without compressing.

Figure 5:
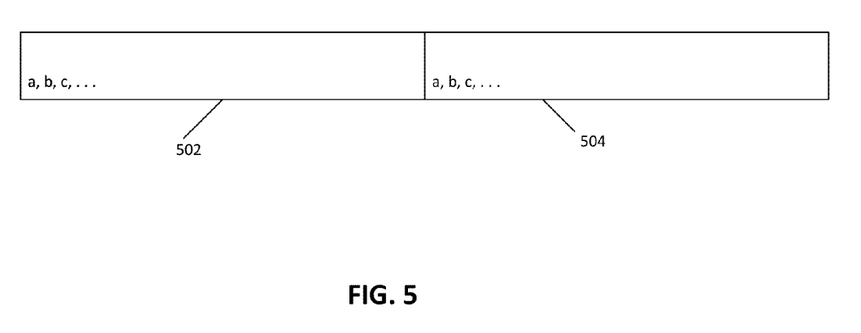
FIG. 5 depicts an example ring buffer that may be used by the data compressor of FIG. 3.

FIG. 5 depicts an example ring buffer that may be used by the data compressor of FIG. 3. Ring buffer 500 stores data that the compressor may compress. Ring buffer 500 comprises two portions ring buffer-1 502 and ring buffer-2 504. Each of ring buffer-1 502 and ring buffer-2 504 stores the same information. That is, where ring buffer-1 502 and ring buffer-2 504 each have a length of $2^{15}$ bits, the same data stored in the $2^{15}$ bits of ring buffer-1 502 is also stored in the $2^{15}$ bits of ring buffer-2 504.

In a ring buffer, a pointer is kept to a start point or current point of the data. In embodiments, a pointer is also kept to an end point of the data. When the end of the ring buffer is reached, the next element of the ring buffer addressed is the first element of the ring buffer. In some ring buffers, where an amount of data is accessed that extends beyond the end of the ring buffer, data from the front of the buffer is accessed—the arithmetic for accessing data from the ring buffer is modulo based on the size of the ring buffer.

In ring buffer 500, this modulo arithmetic need not occur, increasing the speed at which data may be accessed (for example, because performing a data access does not require checking to see whether the end of the ring buffer has been reached). The modulo arithmetic need not occur because ring buffer 500 comprises two copies of the data that is being stored—ring buffer-1 502 and ring buffer-2 504. Accesses of data are made beginning in ring buffer-1 502. When the data access extends beyond the end of ring buffer-1 502, rather than wrapping back to the start of the ring buffer, the data access may continue into ring buffer-2 504, which contains the same data as ring buffer-1 502.

Figure 6:
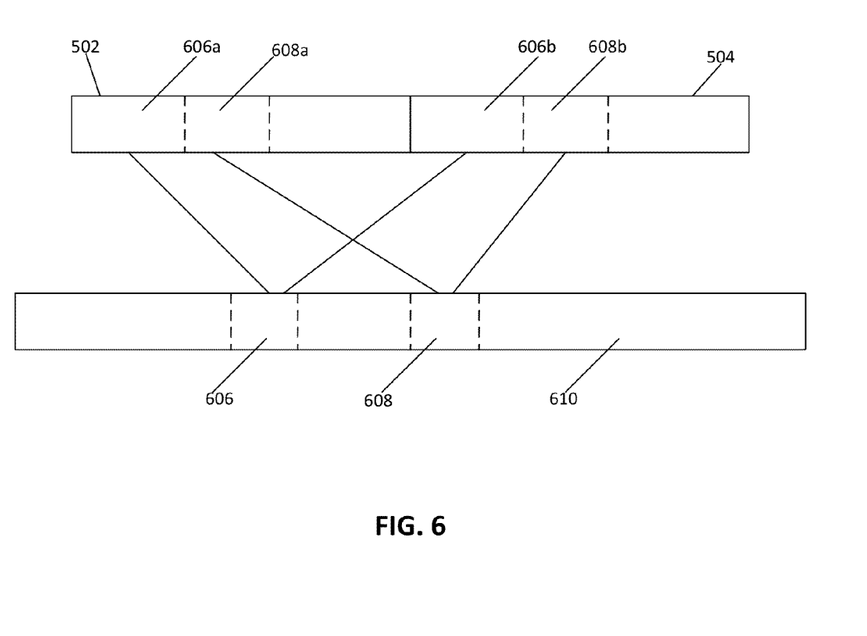
FIG. 6 depicts the example ring buffer of FIG. 4 as mapped to physical memory.

FIG. 6 depicts the example ring buffer of FIG. 4 as mapped to physical memory. In embodiments of the invention, ring buffer 400 may be implemented in virtual memory that is mapped to physical memory 610. Virtual memory is typically mapped to physical memory page-by-page. That is, one page of virtual memory—such as 4,096 bytes—is allocated a contiguous section of 4,096 bytes in physical memory.

The data that is duplicated between ring buffer-1 402 and ring buffer-2 404 may be duplicated through a single memory write operation by using virtual memory. The data may be duplicated by associating both a page for ring buffer-1 402 and a page for ring buffer-2 404 to the same page in physical memory. For instance, page 606*a* of ring buffer-1 402 and page 606*b* of ring buffer-2 404 are both mapped to the same physical page—page 606 of physical memory 610. Likewise, page 608*a* of ring buffer-1 402 and page 608*b* of ring buffer-2 404 are both mapped to the same physical page—page 608 of physical memory 610. In doing so, one operation to modify a physical page is then reflected in both of its corresponding virtual pages. For instance, a modification to physical page 606 is reflected in virtual page 606*a* and virtual page 606*b* because they are both mapped to physical page 606.

Similarly, a modification to the data at one virtual address affects the corresponding physical memory, so it instantaneously appears at the corresponding virtual address in the other half of the buffer.

FIG. 7 depicts an example compression of data. Source data 700 is processed to produce intermediate data 702, which is then processed to produce compressed data 704. Source data is processed with a chunker to produce intermediate data 702. A chunker is generally able to efficiently find larger matches of data but not smaller matches of data. There larger matches are identified in a table that is prepended to the unique data of data 700 in intermediate data 702. Intermediate data 702, comprising the identified matches and the unique data, is then compressed using a compressor that achieves further compression by determining and encoding smaller runs of matching characters. This operation on intermediate data produces compressed data 704.

Decompression of compressed data 704 may likewise be achieved through a two-step process. The smaller runs of matching characters found in intermediate data 702 may be expanded to produce a representation of intermediate data 702—comprising the identified matches and the unique data. This representation of intermediate data 702 may then be expanded by reproducing the matched data at each location identified by the table of matches to produce a representation of decompressed data 700.

FIG. 8 depicts another example compression of data. The compression of data depicted in FIG. 8 differs from the compression of data depicted in FIG. 7. For example, as depicted in FIG. 8, no intermediate data is produced, like intermediate data 702 of FIG. 7, which saves on storage requirements.

As depicted, the source data of FIG. 8 is the same as the source data of FIG. 7—it is source data 700. Source data 700 may be processed to determine metadata table 802. In embodiments of the invention, hint generator 400 of FIG. 4 may process source data 700 to produce metadata table 802, where metadata table 802 identifies the matches (or hints thereof) determined by hint generator 400.

Source data 700 and metadata table 802 may then be used to determine compressed data 804. In embodiments of the invention, hint processor 340 of FIG. 4 of FIG. 4 receives source data 700 and metadata table 802 from hint generator 400 of FIG. 4, and hint processor 340 works with compressor 350 of FIG. 4 to compress the data based on these hints of matches, producing compressed data 804.

In contrast to the decompression described with respect to compressed data 704 of FIG. 7, which involves two passes, compressed data 804 of FIG. 8 may be decompressed in a single pass to produce a representation of source data 700. During decompression, each identified encoded position refers to a preceding part of the compressed data. When an identified encoded position is encountered, it may be immediately decompressed. When the data has been traversed once, each such encoded position may be decompressed, producing a representation of source data 700.

While the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for compressing data for transmission in a remote presentation session, comprising:
   receiving data to be transmitted to a client via a remote presentation session, the data comprising:
      a first hint based on a first portion of the data, the first hint including an indication to apply a first technique to the first portion of the data, the first technique comprising encoding the first portion of the data as a reference to a third portion of the data that matches the first portion of the data, wherein the first portion of the data is identified based on determining that a chunk of the first portion of the data matches a chunk of the third portion of the data; and
      a second hint based on a second portion of the data, the second hint including an indication to apply a second technique to the second portion of the data, the second technique comprising copying the second portion of the data without encoding the second portion of data;
   based on the first hint, applying the first technique to encode the first portion of the data;
   based on the second hint, applying the second technique to the second portion of the data; and
   sending an output stream comprising the encoded first portion of data and the copied second portion of data to the client via the remote presentation session.

2. The method of claim 1, wherein the second hint is based on determining that the second portion of the data has already been compressed.

3. The method of claim 2, wherein determining that the second portion of the data has already been compressed comprises:
   determining that the second portion of the data comprises image data in a compressed format.

4. The method of claim 1, wherein the first hint is based on determining that the first portion of the data matches the third portion of the data using a rolling hash.

5. The method of claim 1, wherein the second hint is based on determining that an amount of available computing resources has changed since providing the first hint to encode the first portion of the data with the first technique.

6. The method of claim 1, wherein applying the first technique to the first portion of the data further comprises:
   writing the first portion of the data into the output stream as a reference to the third portion of the data without sending the first portion of the data to an encoder.

7. The method of claim 1, wherein applying the first technique to the first portion of the data further comprises:
   transferring the first portion of the data to an encoder, the encoder writing the first portion of the data into the output stream as a reference to the third portion of the data.

8. The method of claim 1, further comprising:
   upon applying the first technique to encode the first portion of the data, advancing to the second hint.

9. The method of claim 1, the data further comprising:
   a third hint based on a third portion of the data, the third hint including an indication to apply a third technique to the third portion of the data, the third technique comprising encoding the third portion of the data as a literal.

10. The method of claim 9, further comprising:
    upon applying the second technique to copy the second portion of the data, advancing to the third hint.

11. The method of claim 1, the data further comprising:
    a fourth portion of data that is not associated with a hint, wherein the fourth portion of data is compressed based on a default technique.

12. A system for compressing data for transmission in a remote presentation session, comprising:
    a processor; and
    a memory communicatively coupled to the processor when the system is operational, the memory bearing processor-executable instructions that, when executed on the processor, cause the system to at least:
      receive data to be transmitted to a client via a remote presentation session, the data comprising:
        a first hint based on a first portion of the data, the first hint including an indication to apply a first technique to the first portion of the data, wherein the first portion of the data is identified based on determining that a chunk of the first portion of the data matches a chunk of a third portion of the data; and
        a second hint based on the contents of a second portion of the data, the second hint including an indication to apply a second technique to the second portion of the data, the second technique comprising copying the second portion of the data without encoding the second portion of data;
      based on the first hint, apply the first technique to the first portion of the data;

based on the second hint, apply the second technique to the second portion of the data; and send an output stream to the client via the remote presentation session.

13. The system of claim 12, wherein the first hint is based on:
   a determination that a first hash value of the first portion of the data matches a second hash value of the third portion of the data; and
   a determination that the first technique is indicative of encoding the first portion of the data as a reference to the third portion of the data based on the match between the first hash value and the second hash value.

14. The system of claim 12, wherein the second hint is based on a determination that the second portion of the data has already been compressed.

15. The system of claim 14, wherein the determination that the second portion of the data has already been compressed further comprises a determination that the second portion of the data comprises image data in a compressed format.

16. The system of claim 12, wherein the first technique comprises encoding the first portion of data as a reference to a third portion of data that matches the first portion of the data.

17. The system of claim 12, wherein the second technique comprises encoding the second portion of data as a literal.

18. The system of claim 12, further comprising:
   upon applying the first technique to encode the first portion of the data, advance to the second hint.

19. A computer-readable storage device for compressing data for transmission in a remote presentation session, bearing computer-readable instructions, that when executed on a computer, cause the computer to perform operations comprising:
   receiving data to be transmitted to a client via a remote presentation session, the data comprising:
      a first hint based on a first portion of the data, the first hint including an indication to apply a first technique to the first portion of the data wherein the first portion of the data is identified based on determining that a chunk of the first portion of the data matches a chunk of a third portion of the data; and
      a second hint based on the contents of a second portion of the data, the second hint including an indication to apply a second technique to the second portion of the data, the second technique comprising copying the second portion of the data without encoding the second portion of data;
   based on the first hint, applying the first technique to the first portion of the data;
   upon applying the first technique to the first portion of the data, advancing to the second hint;
   based on the second hint, applying the second technique to the second portion of the data; and
   sending an output stream to the client via the remote presentation session.

* * * * *